United States Patent Office

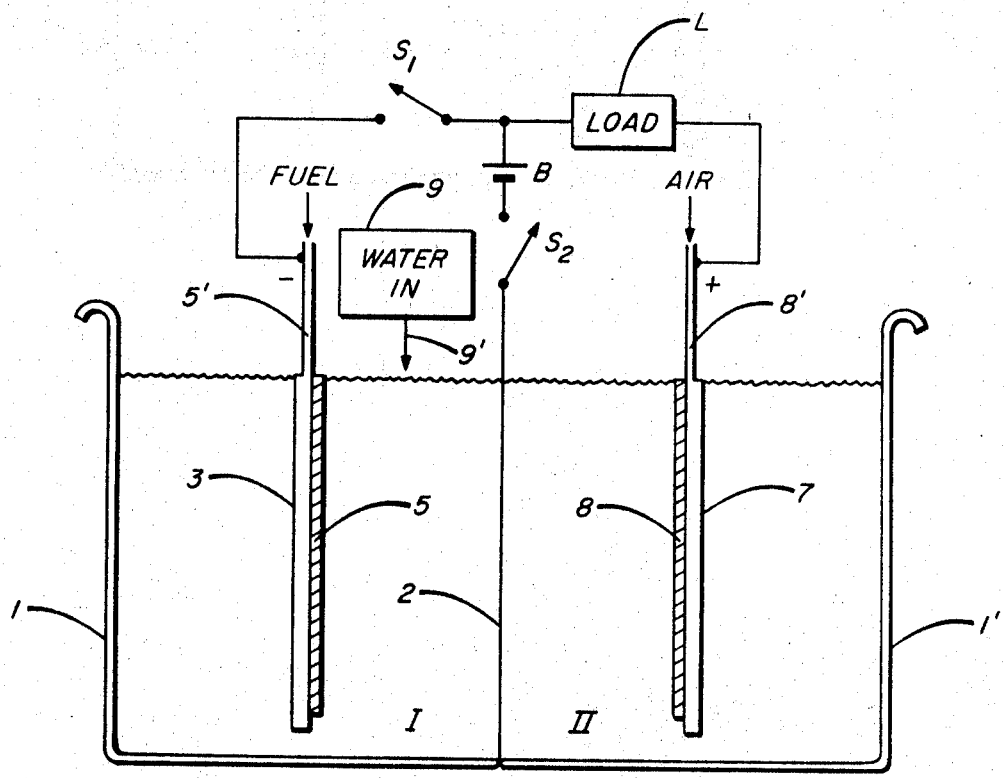
WALTER JUDA
DAVID McLEOD MOULTON
ROBERT L. NOVACK, INVENTORS
BY Rines and Rines
ATTORNEYS

3,470,026
Patented Sept. 30, 1969

3,470,026
METHOD OF OPERATING FUEL CELL WITH CARBON-CONTAINING FUEL
Walter Juda, Lexington, David McLeod Moulton, Scituate, and Robert L. Novack, Arlington, Mass., assignors to Prototech Incorporated, Cambridge, Mass., a corporation of Massachusetts
Filed Mar. 3, 1965, Ser. No. 436,766
Int. Cl. H01m 27/14
U.S. Cl. 136—86                                                1 Claim

ABSTRACT OF THE DISCLOSURE

The disclosed electrochemical methods and apparatus employ incompatible ion-containing media separated by an ion-impervious selectively-permeable conducting membrane and are concerned with the addition of an oxygen-containing additive in order to oxidize substantially completely the carbon of a fuel supplied to one of the media. Hydrogen concentration in the membrane may be controlled by electrical biasing of the membrane from an external potential.

---

The present invention relates to electrochemical methods and apparatus and, more specifically, to electrochemical apparatus in which a fuel, such as hydrogen, is to be converted into electricity or otherwise utilized as by fuel-cell action or other electrochemical operation.

In connection with one aspect of the invention, certain problems inherent in the prior-art utilization of alcohols and hydrocarbons as fuel-cell fuels, operating with acid electrolytic media, have plagued the art. While electrolytes such as sulfuric acid and phosphoric acid have been used in conjunction with alcohol and hydrocarbon fuel anodes to oxidize the same electrochemically to carbon dioxide and water at moderate temperatures in about the 100°–200° C. range, successful fuel-anode performance has required the use of sizable amounts of expensive electrode catalyst. Platinum and other platinum group metals have been employed for these purposes. In addition, the use of oxidant in such fuel cell acidic electrolytic media has been subject to difficulties in effecting electrochemical oxygen reduction in acid. Further, when an oxygen cathode is used directly in the acid, fuel is wasted, especially dissolved fuel, which diffuses to the cathode and chemically depolarizes the same. In order to minimize such as loss, it has been proposed to keep the fuel concentration low; but this adversely affects the anode polarization and requires critical control. It has also been proposed to try to obviate these problems by spacing the electrodes further apart and employing a diffusion barrier; but this has resulted in a deleterious increase in the cell IR drop.

An object of the present invention, accordingly, is to provide a new and improved electrochemical method and apparatus that overcome the above-mentioned difficulties and that employ two invariant electrolytic media—one acid and one base—separated by a hydrogen permeable membrane that permits the transmission of hydrogen and electronic current, only.

Although, broadly speaking, the combination of an anodic acid medium and a cathodic basic medium is not of itself new, it has been discovered that in order to enable practical and successful fuel cell operation with such a structure, water or other source of oxygen-containing additive should be added incrementally to a degree such as to produce proper anodic depolarization by substantially complete oxidation of the carbon contained in the fuel. It has also been found that an oxygen-containing or oxygenated acid electrolyte is required to avoid undesirable side reactions. If, as an illustration, hydrochloric acid were employed as the electrolytic medium, any chloride discharge leading to chlorination of the fuel would cause variance in the electrolytic medium and decided loss of efficiency.

A further object of the invention is to provide a new and improved fuel cell of more general utility, also.

An additional object is to provide, not only in such a cell, but in other types of electrochemical apparatus in which hydrogen is to permeate through a conductive hydrogen-permeable membrane, a novel control of the hydrogen concentration in the membrane through the utilization of, preferably, electric bias potentials.

Other and further objects will be made more apparent hereinafter and are more particularly delineated in connection with the appended claims.

The invention will now be described in connection with the accompanying drawing, the single figure of which illustrates a preferred embodiment as applied to a bi-electrolyte fuel cell apparatus.

Referring to the drawing, an acidic electrolytic medium is provided at I within a left-hand chamber bounded by the left-hand walls and bottom surface 1 of the cell housing and a right-hand wall 2 in the form of a conductive ion-impervious membrane extending across the housing. The membrane 2, however, is permeable to, for example, hydrogen gas resulting from a fuel that is applied, as later explained, to the acid electrolytic medium I. Suitable membrane materials having these properties include, as illustrations, palladium, silver-palladium alloys, and the like.

A basic electrolytic medium is provided at II in a chamber bounded by the membrane 2 and by the right-hand walls and bottom portion 1' of the cell housing. Thus, the incompatible acid and base ion-containing media I and II are separated from each other by the ion-impervious conductive membrane 2 that is, however, permeable to, for example, hydrogen generated in the medium I.

A fuel cell anode 3, shown in the form of a fuel-porous surface 5 to which fuel may be passed through a tubular inlet support 5', is disposed in the acid electrolytic medium or anolyte I; and, preferably, though not essentially, a similar cathode 7, having an oxidant-porous surface 8 to which oxidant may be applied through a tubular support 8', is similarly disposed in the basic electrolytic medium or catholyte II. Clearly, other types of conventional fuel cell anode-cathode structures and means for introducing fuel and oxidant may also be employed, as is well understood in the art. A cover for the cell and other conventional fuel cell structures are not illustrated in order to detract from the feautres of novelty. The anode 3 is connected at the terminal labeled "—" to an output circuit comprising a switch $S_1$ and any desired load L. Upon closure of the switch $S_1$, the output circuit is completed to the cathode at the terminal labeled "+", to enable current to be drawn from the fuel cell in response to the electrochemical reactions taking place therein.

In the operation of this type of cell, it has been discovered that it is important for an oxygen-containing additive to be supplied to the anode medium I at a sufficient rate substantially completely to oxidize the carbon of the fuel applied at 5', if, as before mentioned, undesirable side reactions that result in variance of the electrolytic medium and loss of efficiency are to be avoided. A preferred technique for effecting the oxygen additive is schematically illustrated at 9, representing a source of water which by conventional metering means is added, as shown by the arrow 9', to the acid electrolyte I, serving as a source of oxygen that has been determined to be required for anodic depolarization; the anodic oxygen-containing cell portion I being run as a driven cell with the oxygen additive supplied by the increments of water at 9' enabling substantially complete oxidation of the carbon of the fuel. As an illustration, if methanol is employed as the fuel, increments of water are added sufficiently during the continual operation of the cell to provide the amount of oxygen required for anodic depolarization substantially in accordance with the reaction:

$$CH_3OR + H_2O \rightarrow CO_2 + 6H^+ + 6 \text{ electrons}$$

In addition, in important applications of this cell, it has been found that initially, when no hydrogen has formed on the left-hand or acid side I of the hydrogen-permeable membrane 2, the cell cannot reliably start its operation without the application of a novel biasing potential, illustrated as supplied by closing switch $S_2$ to apply potential of a D.C. source B to the membrane 2, relative to the anode 3. The utilization of this bias potential has, in such applications, been found to be required in order to produce hydrogen electrolytically within the hydrogen-permeable membrane 2, the cell then being operated in a driven manner. When the hydrogen within the membrane 2 reached a sufficient concentration to support the current required, a self-controlled steady state became established in which the hydrogen entering the membrane 2 from the acid side I substantially balanced the hydrogen leaving at the basic side II of the conducting membrane 2. At such time, the switch $S_2$ may be opened, as shown.

More generically, and apart from the use of the illustrated bi-electrolytic structure, when hydrogen is applied to one surface, say the left-hand surface, of a palladium, silver-palladium or similar hydrogen-porous membrane, and an electrolytic medium contacts the membrane on the opposite or right-hand surface for enabling electrochemical oxidation of the hydrogen atoms that diffuse through the membrane, while enabling conduction of resulting electrons along the membrane, the application of the electrical bias potential B to the membrane has thus been found to enable a very effective control over the hydrogen concentration in the said membrane. If the above-mentioned electrolytic medium at the right-hand surface is acidic, the electrochemical oxidation takes place substantially in accordance with the relationship $$H \rightarrow H^+ + \text{electron}$$

whereas, if the electrolytic medium is basic, the electrochemical oxidation of the hydrogen will take place substantially in accordance with the relationship $$H + OH^- \rightarrow H_2O + \text{electron}$$

Thus, the utilization of the bias potential B has been determined to have a controlling effect upon the hydrogen concentration within the membrane 2, having an effect on the polarization on the right-hand side of the membrane and having a most desirable effect on the start-up characteristics of the specific bi-electrolyte cell illustrated in the drawing.

It is important to note that in a fuel cell, the concentration of hydrogen in such a membrane 2, once determined will not be substantially changed. The process of oxygen deposition (which occurs in the driven cell operating with switch $S_2$ closed) cannot take place because the total voltage is not great enough. On the acid side I, no constituent of the solution other than hydrogen will react at the membrane 2. The consequences of this are twofold. First, all of the hydrogen discharged at the membrane 2 will be electrochemically consumed on the other side; any evolution of gaseous hydrogen would result in a net positive charge accumulating on the membrane 2 with no means for removing it. Secondly, the membrane 2 cannot be overpolarized since all hydrogen ion removed on the basic side II must be compensated for by hydrogen deposited on the acidic side I.

As an illustration, a cell of the very nature shown in the drawing has been successfully operated with platinum anode and cathode electrodes 3 and 7. The anode 3 was disposed in an 85% $H_3PO_4$ medium I operated at about 100° C. in an anodic chamber about 2" deep, 1⅛" long, and 7/16" wide, the anode having an exposed area of about 5.6 cm.² The membrane 2 was a 1 mil, 25% Ag-75% Pd foil separating the chamber I from a similar basic chamber II containing 10 N KOH, with the volume of acid and base in the respective chambers I and II being the same at about 16 cm.³. Water was added with the $H_3PO_4$ electrolyte sufficiently to enable substantially complete oxidation of the carbon in methanol fuel applied to the anode at 5', air being applied to the cathode at 8'.

Satisfactory and consistent start-up characteristics were produced by connecting a battery B of between 0.20 and 0.35 volts with the negative terminal connected to the membrane 2 for a period of about ten minutes, and then removing the same by opening the switch $S_2$ so that fuel cell operation produced satisfactory output current in the load L.

Other successful anodes that have demonstrated efficient operation with methanol in the region of 100°–140° C. with a platinum loading of the order of 1.3 mg./cm.² have resulted in output currents of 100 ma./cm.² at 0.5 volt polarization in phosphoric acid. A somewhat higher platinum loading of the anode 3 produced the same performance in about 85% sulfuric acid at 100° C.

The general technique illustrated in FIG. 1 may also be applied to a system wherein the gas present in the basic medium II may pass through an appropriate ion-impervious conductive membrane separator permeable, however, to said gas. Similarly, the techniques of the invention are applicable with other acids and bases, and other anodes and separator membranes not attacked by such electrolytes or protectable therefrom may be used. Other oxidant additives than water may also be employed, as may different types of carbon and hydrogen-containing fuels. Clearly, moreover, the fuel may also be dissolved in the oxygen-containing acidic electrolytic medium I.

While substantially $CO_2$-free air is preferred in the system of FIG. 1 as the oxidant, oxygen or other fuel cell oxidants may also be employed. In addition, the control of hydrogen concentration in the hydrogen permeable membrane 2 by the bias potential may be applied to fuel anode control and other related electrochemical processes.

Further modifications will also occur to those skilled in this art and all such are considered to fall within the spirit and scope of the invention as defined in the appended claims.

What is claimed is:

1. A method of operating an electrochemical apparatus containing anode- and cathode-electrode cells respectively having an oxygenated acid-containing anolyte medium and an incompatible basic catholyte medium separated by an ion-impervious conducting membrane permeable only to hydrogen, that comprises, introducing carbon- and hydrogen-containing fuel and oxidant respectively to the anode- and cathode-electrode cells, supplying on a continual basis oxygen-containing additive to the anolyte medium of the anode-electrode cell in an amount and at a rate sufficient to oxidize substantially all of the carbon of the fuel, and electrically biasing the membrane by an external potential to control the hydrogen concentration in the membrane.

References Cited

UNITED STATES PATENTS

| | | | |
|---|---|---|---|
| 736,017 | 8/1903 | Reid | 136—86 |
| 3,275,476 | 9/1966 | Rightmire et al. | 136—86 |
| 3,092,516 | 6/1963 | Rightmire | 136—86 |
| 3,152,015 | 10/1964 | Tirrell | 136—86 |
| 3,220,887 | 11/1965 | Delahunt et al. | 136—86 X |

FOREIGN PATENTS

| | | |
|---|---|---|
| 616,031 | 3/1961 | Canada. |
| 1,166,831 | 11/1958 | France. |

(Other references on following page)

OTHER REFERENCES

Farkas, A. Dalbert, "On the Electrolytic Separation of the Hydrogen Isotopes on a Palladium Cathode," in Trans. Faraday Soc., April 1937 (only pp. 552, 553, 556 relied upon.)

Krause et al. "On Palladium-Hydrogen" in The Electrochemical Society, Preprint 68-3 1935 (only pages 35 and 41 relied upon).

ALLEN B. CURTIS, Primary Examiner